J. B. WHITEHEAD.
SYSTEM OF ELECTRICAL TRANSMISSION.
APPLICATION FILED SEPT. 15, 1910.
1,078,711.
Patented Nov. 18, 1913.
3 SHEETS—SHEET 3.
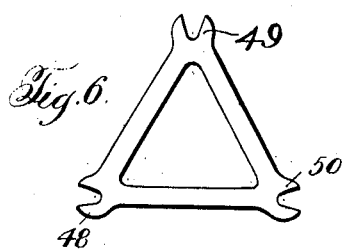
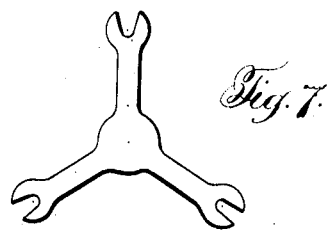
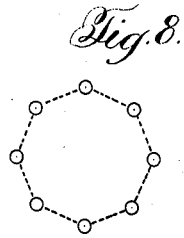
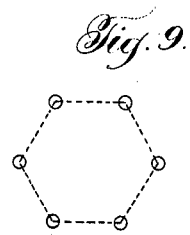
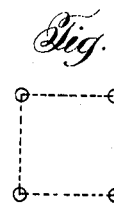
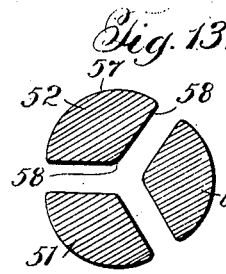
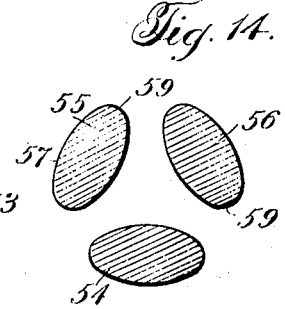
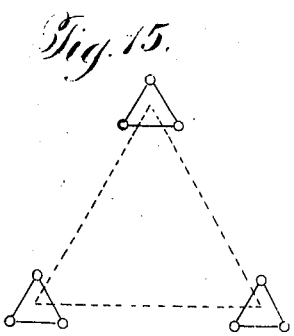
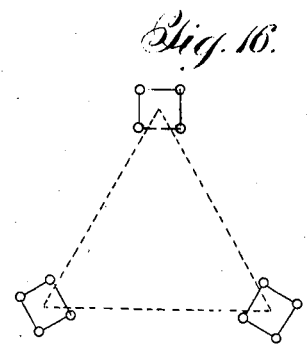
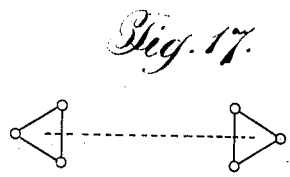

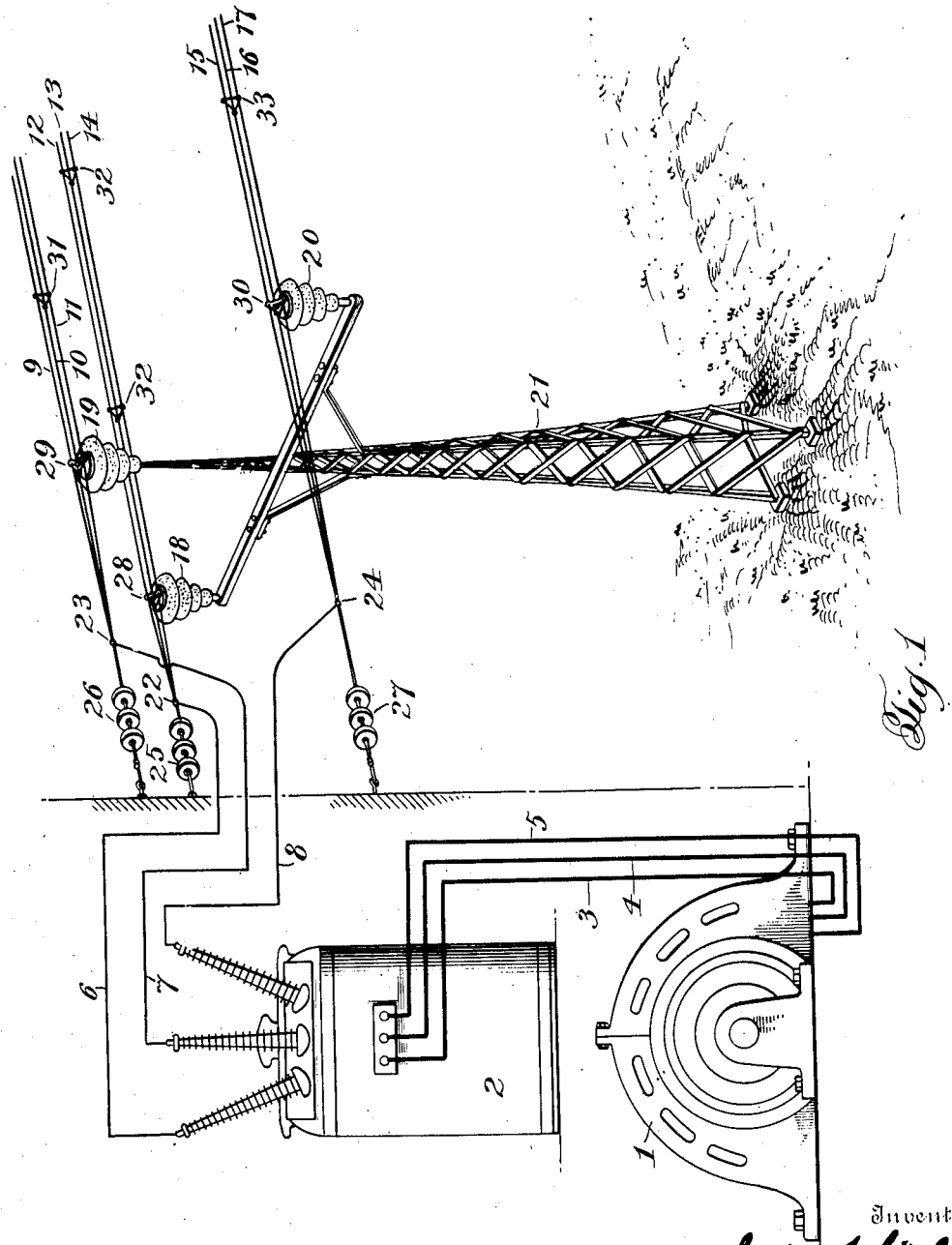

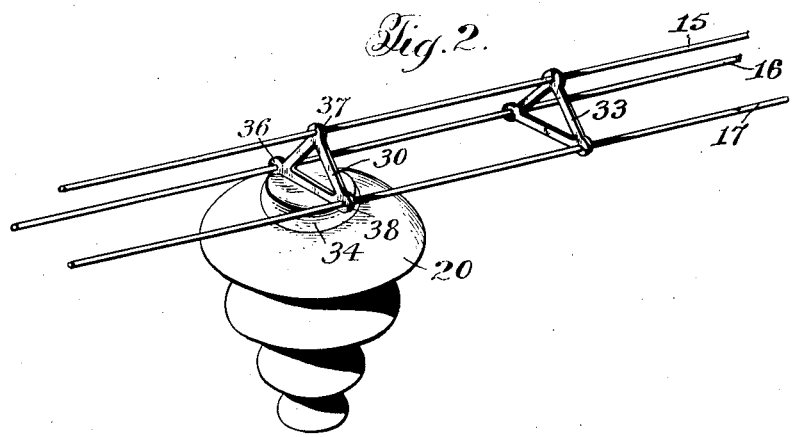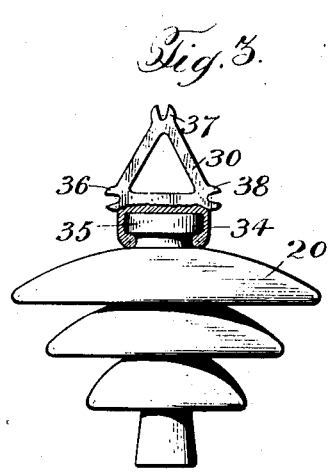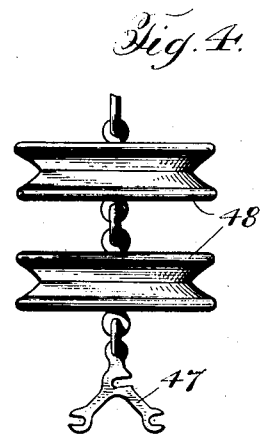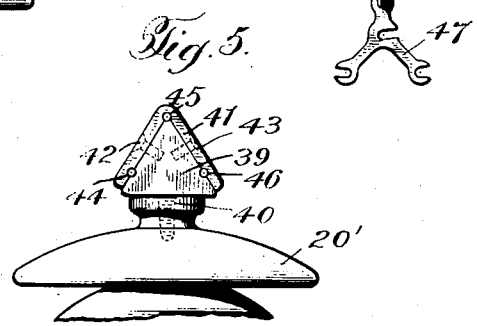

UNITED STATES PATENT OFFICE.

JOHN B. WHITEHEAD, OF BALTIMORE, MARYLAND.

SYSTEM OF ELECTRICAL TRANSMISSION.

1,078,711.   Specification of Letters Patent.   Patented Nov. 18, 1913.

Application filed September 15, 1910.  Serial No. 582,223.

*To all whom it may concern:*

Be it known that I, JOHN B. WHITEHEAD, a citizen of the United States, residing at Baltimore city, State of Maryland, have invented certain new and useful Improvements in Systems of Electrical Transmission, of which the following is a specification.

The primary object of this invention is to lessen the electric strain on the air or other insulation around the wires of a high voltage transmission system, and thus permit the use of higher voltages than possible heretofore.

In a simple two wire high voltage transmission line the air between the wires is subject to electric strain. This strain is usually stated in kilo-volts per centimeter and is greatest at the surface of the wires. It is least at a point midway between the wires. Also, at a given voltage the maximum strain at the surface of the wires will be greater the nearer the wires are together, and for a given distance of separation will be greater the smaller the diameter of the wire. The values of this strain expressed in kilo-volts per centimeter admit of simple calculation when the constants (size wire, separation and voltage) are given.

The chief value of using high voltage is in the reduction of the size of the wire and thus lengthening the commercial distance of transmission. This reduction of the size of wire, or continued increase in voltage for a given size wire, brings the strain on the air near the wires to a point where the air breaks down and the insulating properties of air thus become a limiting factor in the distance to which electrical energy may be economically transmitted. I have discovered that the electric intensity at which air or other insulating medium surrounding the high potential conductor breaks down depends on the volume of air submitted to the electric intensity. Therefore, if the electric intensity is limited to a small volume or region of air, the smaller this volume, the higher the intensity required to break down the insulation. Thus, for example, in the triangular arrangement of three conductors hereinafter described the electric intensity is at a maximum at the apexes of the triangle but its value falls off sharply on each side of an apex due to the influence of the other two wires of the triangle. Consequently the electric intensity at this point may be pushed to a far higher value than will break down the air or other insulating medium at the surface of a single wire of equal section to the three of the triangle or at the surface of a single wire of the same size as one of those of the triangle, owing to the fact that the region which is subjected to the maximum strain or intensity is a very restricted area by reason of the influence of the other two wires of the triangle as described above.

My invention consists primarily in the arranging of the several wires of a multiple conductor so as to take the greatest advantage of my above discovery with reference to the property of the insulating medium. In practice I accomplish this by subdividing the total cross-section of what would otherwise constitute a single conductor in a high potential distribution system, into several smaller wires, and placing these in the form of some preferably symmetrical figure, as for example, a triangle, square, hexagon, etc. The dimensions of these symmetrical figures are small compared with the distance between the several sets of these wires constituting the several conductors or legs of the transmission system, the distance of the strands of an individual leg of the system from each other depending upon the distance of the legs from each other. My discovery shows that the electric strain on the air near these conductors may by proper arrangement be allowed to reach greater values than that required to rupture the air around a single wire of equal cross section, or around a single wire of the size of one of the component wires of the figure. Thus the aggregate cross section may be reduced, or the voltage increased without exceeding the permissible figures for the strain on the air. The conditions will be the better, the greater the number of smaller wires and the more nearly that they are placed in the form of a circle. In the installation shown in Fig. 1 of the drawings, but three wires in a group or leg of the circuit are employed, but the mechanical elements in such a case are so simple that this in a large measure compensates for the loss in theoretical electrical efficiency.

In order to more fully describe my invention reference will be had to the accompanying drawings wherein, Figure 1, is a semi-diagrammatic view of a high voltage three-phase alternating current transmission system embodying a form of my said invention; Fig. 2, a detail perspective view of a high tension insulator equipped with wire holder or bracket, and supporting three wires of one leg of the line indicated in Fig. 1, and showing also one of the spreaders or brackets for keeping the wires properly spaced at points other than on the insulators. Fig. 3, a side elevation partly in section of the insulator and wire holder shown in Fig. 2; Fig. 4, a high tension insulator of the linked type with suspended wire holder for supporting multiple wires according to my invention; Fig. 5, a fragmentary side elevation of a high tension insulator provided with another form of wire holding device embodying my present invention; Figs. 6 and 7, enlarged detail front elevations of two forms of spreader, showing wire retaining jaws open. Figs. 8, 9, 10 and 11 are diagrams showing some symmetrical arrangements which the several conductors of a "leg" of a circuit may assume according to my invention; Fig. 12, a cross section of an ordinary line conductor of circular cross section; Figs. 13 and 14, are diagrams showing special forms of conductors shaped and arranged relative to each other in accordance with my invention, and, Figs. 15, 16 and 17 are diagrams showing how the several legs of a circuit should be arranged relative to each other according to my invention.

Referring first to Fig. 1. 1, represents a three phase alternator; 2, a high voltage step-up transformer connected to said alternator through conductors 3, 4 and 5, and to line through conductors 6, 7 and 8. Each leg of the main line in this case consists of three conductors, one comprising conductors 9, 10, 11; another, conductors 12, 13, 14, and the other, conductors 15, 16, 17, supported upon high tension insulators 18, 19 and 20 carried on any suitable structure such as tower 21. The three conductors of each leg of the circuit are electrically connected together as at points 22, 23 and 24 by any suitable junction device, and at these points are tapped on to the line the three conductors 6, 7 and 8. The junction points 22, 23 and 24 are then connected to three insulators 25, 26 and 27 which are anchored in any suitable way to some fixed structure. This simply represents one of the many ways the ends of the lines may be supported. The other end of the line may be supported in a similar or any suitable way. The showing of the alternator and transformer and connections are purely diagrammatic, and for the sake of simplicity, practical equipment such as switches and other devices have been omitted. Other possible methods of generator and transformer connection have also been omitted. Each of the insulators 18, 19 and 20 carries a supporting bracket of metal or other material. These brackets, indicated by the numerals 28, 29, 30 support the several conductors of each "leg" of the line and keep them separated in symmetrical arrangement. If of metal these separators will also form an electrical connection between the several conductors. The proper arrangement of these conductors between insulators is maintained by spreaders or separators 31, 32 and 33 of metal or other material located along the line at desired intervals. These latter separators are simply light brackets having openings in which the conductors are secured. These separators may also afford additional electrical connection between the several wires of a "leg." The separator supports of the insulators may be constructed and attached to the insulators in various ways. In the form shown in Figs. 1, 2 and 3, the separator consists of an upright bracket 30 made fast to a cap 34 which is crimped or spun over the head 35 of the insulator. Obviously these caps may be secured to the insulator in any other suitable way. Each of these insulator separators, in the case of a three-wire-to-the-leg arrangement, is provided with three pairs of jaws 36, 37 and 38, (Fig. 3) of malleable material so that they might be bent around the wires. Before the wires are strung in the brackets, these jaws are open as shown in Fig. 3. In stringing the wires they are inserted between the respective pairs of jaws and these jaws bent around the wires to clench and retain them as shown in Fig. 2. This, however, is but one of the many ways which may, without departing from the spirit of my invention, be employed for retaining the wires in position.

In Fig. 5, the separator is shown in the form of a two part metal clamp, the member 39 being provided with a screw 40 which engages the top of the insulator 20', while the member 41 is held fast by means of screws 42 and 43; the wires passing through the openings 44, 45 and 46.

The wires may be carried suspended instead of supported from below. In this case an arrangement such as shown in Fig. 4, may be employed. A separator 47 is suspended from a high voltage insulator 48 of the linked type. The manner of retaining the wires in position in separator 47 is the same as described with relation to Figs. 2 and 3.

The foregoing are but few of the many ways in which the wires may be supported.

The intermediate spreaders or separators 31—33 may be substantially the same in construction as the insulator bracket separators without the means for attachment to the insulator, the wires being held in said intermediate separators by jaws 48, 49 and 50 bent around the wires just as in the case of bracket 30. In Fig. 6, I have shown one of these intermediate spreaders or separators with its jaws 48, 49 and 50 open; in Fig. 2, they are shown closed. In Fig. 7 is shown a modified form of intermediate spreader in which three arms carrying the wires radiate from a common center. These are but two of the various forms in which these intermediate separators may be made.

In Figs. 8, 9, 10 and 11, I have simply shown some of the various symmetrical arrangements of wires in a leg of a circuit. In Fig. 8, the wires are arranged in the form of a circle; in Fig. 9, in the form of a hexagon; in Fig. 10, a square, and in Fig. 11 there are but two wires. The symmetrical arrangement of the line conductors may take any form between a complete circle and two parallel conductors inclusive as shown in Fig. 11.

The greatest efficiency may be attained if instead of having the individual wires of a group or "leg" circular in cross-section, these have a cross-section such, for example, as indicated in Figs. 13 and 14, and supported in the relative positions shown in those figures. Letting Fig. 12 represent the cross-section of a conductor suitable for a given line transmission, the electrical strain will be lessened by the subdivision of the aggregate cross-section of this conductor into a plurality of wires 51, 52, 53, 54, 55, 56, with portions 57 of greater, and portions 58, 59 of lesser radius of curvature than a given circle, and stringing these wires so that the portions of larger radius will be outward and those of smaller radius contiguous to each other or pointing inward. These wires may be supported in the proper relative positions by supporting separators such as above referred to.

Fig. 15 shows the preferred arrangement of conductors for a three phase system when the conductors of each leg are in triangular formation. In such a case the individual legs of the circuit are located respectively at the apices of a triangle, and the smaller triangles formed by the several wires of the individual legs are so disposed as to have a base pointing inward and an apex pointing outward. When the wires of the individual legs of a three phase or other three-leg circuit are in rectangular or square formation the preferred relative positions of the groups of wires composing the several legs are as shown in Fig. 16, in which the center of each square is at the apex of an equilateral triangle and two sides of each square are perpendicular to the opposite side of the triangle. Fig. 17 shows the preferred disposition of the triangles of the individual legs when applied to a single phase system. In this case as in Fig. 15, each triangle has an apex pointing outward and a base inward. In all of these cases it will be seen that all lines drawn from the neutral point or axis of the system (the center of the triangles indicated by dotted lines in Figs. 15 and 16, for example, and the center of the dotted line connecting the two triangles in Fig. 17) to the neutral points or axes of the individual legs (the centers of the triangles indicated in solid lines in Figs. 15 and 17, and the square indicated in Fig. 16) will be perpendicular to a side of the symmetrical figure into which each leg is divided. In any event, the distance of the strands of an individual leg of the system from each other will depend upon the distance of the legs from each other.

It must be understood that while the installation and most of the forms of my invention herein shown relate to polyphase transmission, my invention is by no means limited to any particular polyphase or single phase system, and is applicable to single or polyphase alternating circuits or to continuous current circuits of any number of conductors. It should also be understood that while I have herein shown the several wires of a leg supported by bracket separators, any other suitable means may be employed for supporting these wires without departing from the spirit of my invention considered in its broader aspect. It should also be understood that while I have shown in Figs. 1 and 2, for example, an application of my invention to a three phase system in which the several legs are in triangular symmetrical arrangement, my invention is not limited to any special arrangement of the legs with respect to each other, though greater efficiency may be attained with some arrangements than with others, as herein before pointed out. This invention is directed more especially to the subdivision of the individual legs and the arrangement of the several conductors composing them.

What I claim is:

1. A high potential transmission system, comprising a circuit having a plurality of legs, at least one of which is made up of a plurality of separated equipotential conductor strands mounted in substantially symmetrical formation about a longitudinal axis, the distance between the several strands of a leg being less than the distance between the several legs of the circuit, whereby the point at which breakdown of insulation occurs is raised above that which it would be for a single strand conductor of a cross-sectional area equal to that of the said plurality of strands, substantially as described.

2. A high potential transmission system, comprising a circuit having a plurality of legs, each of which is made up of a plurality of separated equipotential conductor strands mounted in substantially symmetrical formation about a longitudinal axis, the distance between the several strands of a leg being less than the distance between the several legs of the circuit, whereby the point at which breakdown of insulation occurs is raised above that which it would be for a single strand conductor of a cross-sectional area equal to that of the said plurality of strands, substantially as described.

3. A high potential transmission system, comprising a circuit having a plurality of legs, each of which is made up of a plurality of separated equipotential conductor strands mounted in substantially symmetrical formation about a longitudinal axis, the said legs being so disposed with relation to each other that a line drawn from the axis of the system to the axes of the individual legs will be perpendicular to a side of the symmetrical figure into which each of said legs is divided, whereby the point at which breakdown of insulation occurs is raised above that which it would be for a single strand conductor of a cross-sectional area equal to that of the said plurality of strands.

4. A high potential transmission system, comprising a circuit having a plurality of legs, at least one of which is made up of a plurality of separated equipotential conductor strands mounted in substantially symmetrical formation about a longitudinal axis, the distance between the several strands of a leg being less than the distance between the several legs of the circuit, whereby the point at which breakdown of insulation occurs is raised above that which it would be for a single strand conductor of a cross-sectional area equal to that of the said plurality of strands, and means comprising a plurality of conducting brackets located at intervals along said multiple strand conductors, holding said conductors spaced apart and connecting the same in multiple at intervals.

In testimony whereof I affix my signature in presence of two witnesses.

JOHN B. WHITEHEAD.

Witnesses:
H. J. MENTZER,
PERCY S. SHOVER.